March 12, 1963 C. WELSCH 3,081,070
SALAD MIXER
Filed March 14, 1962

INVENTOR.
Chauncey Welsch
BY
ATTORNEY

United States Patent Office 3,081,070
Patented Mar. 12, 1963

3,081,070
SALAD MIXER
Chauncey Welsch, 210 E. 58th St., New York, N.Y.
Filed Mar. 14, 1962, Ser. No. 179,604
4 Claims. (Cl. 259—89)

The present invention relates to a salad mixer and more particularly to a salad mixer which is completely enclosed to prevent spillage.

In order to prepare a tossed salad, there is a need to intermix the several ingredients and to coat the ingredients uniformly with the salad dressing. At the same time it is important not to squash or otherwise bruise the ingredients. These objectives are hard to reach with ordinary salad utensils.

It is, therefore, an object of the present invention to provide a salad mixer which will fulfill the foregoing requirements.

Another object of the present invention is to provide a salad mixer which will be enclosed to prevent spillage.

A further object of the present invention is to provide a salad mixer which will also serve as a serving dish.

Additional features and advantages of the present invention will be apparent from the following description and drawing in which.

Figure 1:
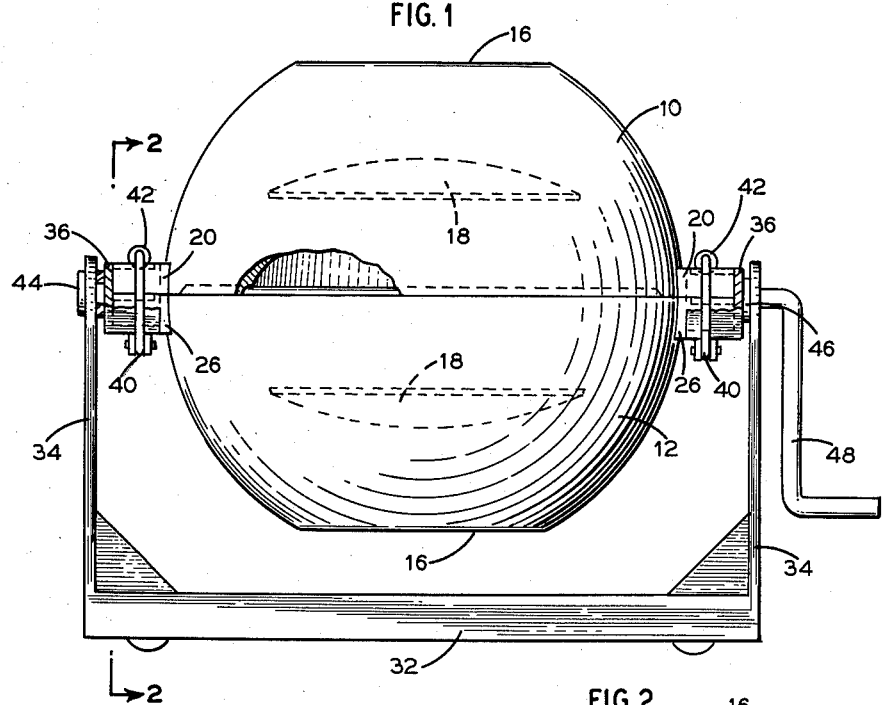
FIG. 1 is a front view of the salad mixer of the present invention, partially broken away to show detail.
Figure 3:
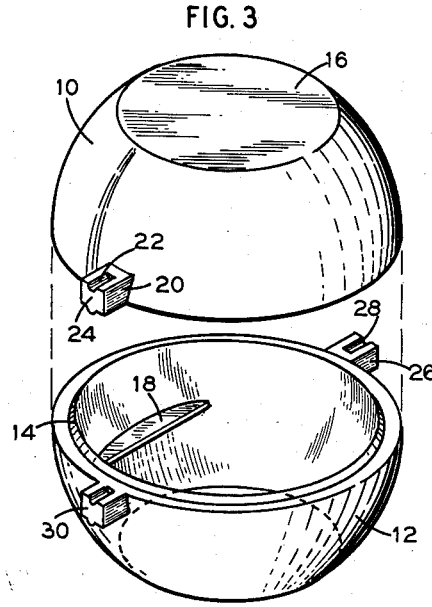
FIG. 3 is a perspective view of the top and bottom portions of the salad mixer when separated.

Referring now to the drawing, there is a salad receptacle having two halves, a top portion 10 and a bottom portion 12. Each of these portions are generally hemispherical and substantially identical, and are adapted to be joined to form a hollow of generally spherical shape which will receive the salad ingredients. To aid in keeping the receptacle portions 10 and 12 aligned, there may be provided in one portion a lip 14 which will be seated in a corresponding channel in the other portion.

Preferably, at least one of the receptacle portions has a flattened bottom 16. The flattened bottom aids the mixing process by interrupting the circular path of the salad ingredients located at the walls of the receptacle, whereas there would be a tendency for the ingredients in a completely spherical bowl to remain in the same circular path. The abrupt change of the wall configuration will throw the outermost ingredients toward the center for better intermingling. The flattened bottom 16 also acts as a base on which the receptacle may be rested when the mixing operation is completed, and in order to convert either or both halves into serving dishes for use right on the dining table. It is, therefore, particularly recommended that both portions of the receptacle be provided with the flattened bottom 16.

A plurality of fins 18 may be arranged along the inner walls of the receptacle. These fins may be placed radially, as shown, or at any other angle to the wall. The fins 18 will also aid the mixing process by interrupting the flow of the ingredients as they slide along the walls.

A pair of ears 20 extend from opposite sides of the rim of the top portion 10. The ears 20 have a groove 22 on their upper surface and a protuberance 24 on their lower surface. The bottom portion 12 has a similar pair of ears 26 located at opposite sides of its rim. In this case, the top surface of the ears 26 has a groove 28, adapted to receive the protuberance 24, and the bottom surface has a protuberance 30. When the two halves of the receptacle are joined together the protuberances 24 of the ears of the top portion 10 rest in the grooves 28 of the ears of the bottom portion 12. The mated ears act as handles by which the closed receptacle may be carried or manually revolved, and also help in keeping the halves in alignment.

To simplify and improve the mixing operation an arrangement is illustrated by which the mixing may be accomplished mechanically. This arrangement includes a stand 32 having an upright 34 at each end. A cradle 36 is disposed inwardly at the top of each upright 34. Each cradle 36 has a groove 38 into which the protuberance 30 of the ears of the bottom portion 12 may be seated. A hinge member 40, attached to the bottom of the cradles 38, is swung up over the cradle. A ball 42, carried by the hinge member 40, engages the groove 22 of the top surface of the ears of the top portion, thus locking the two halves together and to the cradles 36. The cradles 36 are attached to the uprights 34 in a way that will permit them to revolve freely with the salad receptacle. On one side, a knob 44 secures the cradle. On the other side, the cradle is attached to a shaft 46 which passes through the upright and leads to a crank 48 by which the mixer is revolved.

Figure 2:
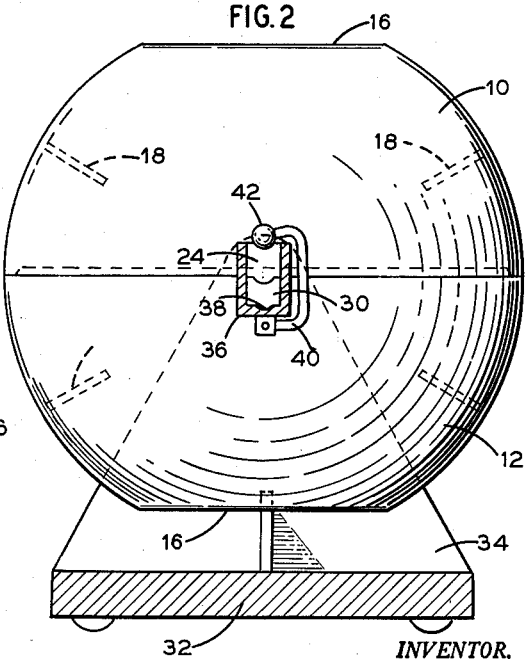
FIG. 2 is a cross-sectional view taken along the line 2—2 of FIG. 1.

The salad ingredients are placed in the receptacle. When the top 10 and bottom portions 12 are held together, and the receptacle is revolved, the ingredients are tossed together for proper mixing. The revolving may be accomplished manually, or mechanically in the arrangement shown in FIGS. 1 and 2. In either case, the mixing will be thorough and even delicate salad greens will not be bruised. When the mixing is completed, the salad may be left in the closed receptacle until serving time. To release the receptacle, the hinge members 40 are disengaged. The salad may now be served from either or both receptacle portions 10 and 12.

The salad mixer may be made from a variety of materials. Wood, plastic, or metal are examples of suitable materials from which the mixer may be made in whole or in part.

An especially versatile salad mixer is thus provided. The construction insures a thorough intermingling of all the ingredients without damage to them and without any possibility of spillage. In addition, the mixer itself is adaptable for use as a serving dish.

While a specific embodiment of the invention has been shown and described in detail to illustrate the application of the invention, it will be understood that the invention may be embodied otherwise without departing from such principles.

What is claimed is:

1. A salad mixer comprising a stand, an upright positioned at each end of said stand, each of said uprights having an inwardly disposed cradle rotatable with respect to said upright, a salad receptacle having two generally hemispherical and substantially identical halves with a top portion and a bottom portion adapted to be joined to form a hollow enclosure of generally spherical shape to contain the salad without spillage during mixing, a pair of ears extending from opposite sides of each of said portions and adapted to fit in mated pairs into said cradles, the ears of one portion having protuberances which mate with grooves in the ears of the other portion, and means releasably to hold the pairs of ears in said cradles to join the two portions together and releasably to hold the salad receptacle in said stand whereby the salad receptacle clears the stand and may be revolved to effect mixing the salad.

2. A salad mixer as in claim 1 in which each of said portions has a flattened bottom to aid in mixing and to provide a base on which each portion may be set down to form a serving bowl.

3. A salad mixer comprising a stand, an upright positioned at each end of said stand, each of said uprights having an inwardly disposed cradle rotatable with respect to said upright, a salad receptacle having two generally hemispherical and substantially identical halves with a top portion and a bottom portion adapted to be joined to form a hollow enclosure of generally spherical shape to contain the salad without spillage during mixing, a pair of ears extending from opposite sides of each of said portions, the ears of one portion having protuberances which mate with grooves in the ears of the other portion, and a hinge member on each of said cradles carrying a ball adapted to engage a groove in the ear of said top portion whereby said mated ears are releasably held in said cradles so that the salad receptacle clears the stand and may be revolved to effect mixing the salad, each of said portions having a flattened bottom to aid in mixing and to provide a base on which each portion may be set down to form a serving bowl.

4. A salad mixer as in claim 3 having a plurality of fins arranged along the inner walls of the said receptacle to aid the mixing process, and crank means attached to one of said cradles to revolve the mixer.

References Cited in the file of this patent

UNITED STATES PATENTS

| | | |
|---|---|---|
| 29,798 | Little | Aug. 28, 1860 |
| 1,977,649 | Sharp | Oct. 23, 1934 |
| 2,577,185 | Easton | Dec. 4, 1951 |
| 2,616,391 | Russell | Nov. 4, 1952 |

FOREIGN PATENTS

| | | |
|---|---|---|
| 971,531 | France | July 26, 1950 |